United States Patent
Arakelyan

(10) Patent No.: US 7,241,130 B2
(45) Date of Patent: Jul. 10, 2007

(54) DEVICE FOR BLOW-MOLDING OR STRETCH BLOW MOLDING OF THERMOPLASTIC CONTAINERS

(75) Inventor: Vigen Arakelyan, Octeville-sur-Mer (FR)

(73) Assignee: Sidel, Octeville-sur-Mer (FR)

(*) Notice: Subject to any disclaimer, the term of this patent is extended or adjusted under 35 U.S.C. 154(b) by 373 days.

(21) Appl. No.: 10/517,207

(22) PCT Filed: Jun. 23, 2003

(86) PCT No.: PCT/FR03/01918

§ 371 (c)(1),
(2), (4) Date: Jan. 21, 2005

(87) PCT Pub. No.: WO2004/002716

PCT Pub. Date: Jan. 8, 2004

(65) Prior Publication Data

US 2006/0093699 A1    May 4, 2006

(30) Foreign Application Priority Data

Jun. 27, 2002    (FR) .................................. 02 08005

(51) Int. Cl.
*B29C 49/56* (2006.01)

(52) U.S. Cl. ..................................................... 425/541
(58) Field of Classification Search ................. 425/541
See application file for complete search history.

(56) References Cited

U.S. PATENT DOCUMENTS

| | | | | |
|---|---|---|---|---|
| 3,004,285 A | * | 10/1961 | Hagen | ............. 425/541 |
| 3,267,184 A | | 8/1966 | Nowicki | |
| 3,856,450 A | | 12/1974 | Britten | |
| 4,290,745 A | | 9/1981 | Kontz | |
| 6,824,377 B2 | * | 11/2004 | Lefebure | ............. 425/541 |

FOREIGN PATENT DOCUMENTS

| | | |
|---|---|---|
| EP | 0 456 866 A | 11/1991 |
| EP | 0 599 778 A | 6/1994 |

* cited by examiner

*Primary Examiner*—Robert B. Davis
(74) *Attorney, Agent, or Firm*—Sughrue Mion, PLLC

(57) ABSTRACT

A device for blow-molding or stretch blow-molding of thermoplastic material performs, the mold including two half-molds and a mold base mutually mobile through actuating devices controlled by a fixed cam. A link rod device with three degrees of freedom in rotation is provided between one half-mold such that upon opening the two half-molds are spaced apart from each other without moving the base, then so that the base moves axially while the two half-molds continue to be mutually and completely spaced apart, and vice-versa.

9 Claims, 6 Drawing Sheets

DEVICE FOR BLOW-MOLDING OR STRETCH BLOW MOLDING OF THERMOPLASTIC CONTAINERS

FIELD OF THE INVENTION

The present invention relates to improvements made to the devices for blow-molding or stretch blow-molding of containers starting from preforms made of thermoplastic, said devices comprising a mold in three parts, namely two half-molds for the body of the container and a mold base for the base of the container, the lower parts of the two half-molds and the upper part of the mold base comprising means which can interlock, in the closed position of the mold, to provide the axial rigidity of the mold in the presence of the blow-molding pressure, the two half-molds being designed to be moved relative to one another, between an open position and a closed position, under the action of actuating means controlled by a fixed cam, this device comprising connection means between at least one half-mold and/or said means for actuating said half-molds, on the one hand, and the mold base, on the other hand, so that the movement of the mold base is controlled by the movement of at least one half-mold and/or said actuating means such that:

during opening of the mold, said actuating means start to move said half-molds apart until said interlockable means are freed from one another, while said connection means remain inoperative and the mold base remains in its position, and then, while said actuating means continue to move the two half-molds apart, the connection means become operational and move the mold base so as to separate it axially from said half-molds;

and such that during closing of the mold, said actuating means start to bring the two half-molds together at the same time as said connection means control the axial movement of the mold base until it reaches its completely raised position, and then, with said connection means becoming inoperative, said actuating means finish bringing the two half-molds together, with engagement with the interlockable means mechanically and axially securing the two half-molds and the mold base.

DESCRIPTION OF THE PRIOR ART

For blow-molding or stretch blow-molding of containers such as bottles starting from heated preforms made of thermoplastic, such as PET, it is known practice to use molds consisting of two half-molds which can move relative to one another between an open position (loading/unloading of the mold) and a closed position (blow-molding or stretching/blow-molding). In particular, it is known practice to design the two half-molds in such a way that they can rotate relative to one another (hinged molds). Many embodiments of such molds, with their closing means and their means for locking them in the closed position, are known (see, for example, FR 2 646 802, FR 2 653 058, FR 2 659 265, FR 2 681 552, FR 2 733 176, FR 2 793 722, all in the name of the Applicant).

Constructing the mold as only two half-molds is possible when the container to be manufactured has a relatively simple shape and can be easily extracted from the mold. This is particularly the case when the base of the container does not have pronounced reliefs (semicircular base or flat base, for example).

The two half-molds are actuated mechanically during closing and opening with the aid of a roller, attached to the half-molds by transmission means, which engages with a cam arranged laterally and having the required profile. There is often a set of several molds mounted on a common rotating support (carousel) and the cam is mounted laterally as a fixed cam.

By contrast, when, as is found in the majority of cases, the base has a complex configuration (petaloid base or rounded base with an inwardly directed convexity, for example), it is not possible, without deformation and therefore without damage, for the container to be extracted from a mold in two parts. That is why use is made of molds in three parts to manufacture such containers having bases of complex shape, these molds comprising two half-molds which can be moved apart/brought together (rotatably articulated, in particular) for molding the body of the container, and a mold base which can be moved axially for molding the base of the container.

As is thus conventional, the actuation of the mold base is passed over to specific means which are equipped with their own roller engaging with a separate cam.

It should additionally be emphasized that, in order to mechanically reinforce the mold when it is subjected to the blow-molding pressure, a means of mechanically securing the two half-molds and the mold base when the mold is in the closed position has been provided. To this end, the lower part of the two half-molds and the upper part of the mold base are mutually overlapping and are equipped with interlockable means, such as, for example, peripheral groove/peripheral projection, for example in the form of an annular projection fitting into the groove. As a result, the axial movement of the mold base can only take place when the two half-molds are in a sufficiently parted position in which the interlocked means are released. It is therefore necessary for the movements of the half-molds and of the mold base to take place in a highly precise sequence.

These requirements lead to the necessity of a rigorous relative positioning of the two cams respectively controlling the movements of the half-molds and of the mold base, with the use of adjusting means for ensuring the required precision of this relative positioning.

Finally, the current design of the molding devices with a mold in three parts, employing two cams controlling the movements of the half-molds and of the mold base respectively, proves to be complex and space-consuming owing to the presence of the double actuating means, and costly to install and to maintain in order to ensure the correct mutual positioning of the two cams, on which the perfect synchronism of the movements of the three constituent parts of the mold is dependent.

To that should be added the problems caused, within rotating systems having multiple molds, by the rollers coming into contact with the fixed cams mounted laterally and by the rebound phenomena which ensue and which generate considerable vibration. Now, in a current three-part mold arrangement, there are at least two rollers which come into contact with two respective cams for each mold, which leads to a cumulation of the vibratory phenomena.

The search for increasingly higher operating speeds, leading to increasingly greater production rates, not only leads one to strive to achieve a structural simplification enabling inertia to be reduced but also to reduce as completely as possible the vibratory phenomena accompanying the rollers when they come into contact with the corresponding cam.

SUMMARY OF THE INVENTION

It is against this background that the invention proposes improving the molding device presented in the preamble, which, being arranged in accordance with the invention, is characterized in that the connection means comprise a connecting rod whose ends are provided with coupling means having three rotational degrees of freedom so as to connect it to the half-mold and/or to said means for actuating said molds and so as to connect it to the mold base, respectively, and in that the connection of the rod with the mold base is arranged so as, during opening of the mold, to pivot freely under the entraining action of the aforesaid half-mold and/or of said means for actuating said half-molds while the two half-molds are parting until a predetermined angular value is obtained, and then to bear against an abutment attached to the mold base when the half-molds are parting at said angular value and/or when said actuating means are in a position in which the half-molds are parting at said angular value, and finally to push the mold base away axially when the two half-molds complete their opening travel, and vice versa during closing of the mold.

Preferably, because it seems to be the simplest to implement, provision is made for said connection means to be interposed between one of the half-molds and the mold base. In particular, when each half-mold consists of a half-mold-carrier unit detachably supporting a metal block in which a half-cavity of the container body is machined, it is preferable for the connection means to be interposed between a mold-carrier unit and the mold base. Likewise, when the mold base comprises a block which is interchangeable to suit the shape of the container, which block is solidly attached to a supporting structure, it is then preferable for the connection means to be interposed between one of the half-molds (or one of the mold-carrier units) and the supporting structure.

By virtue of these provisions, it is possible to dispense with the independent means for actuating the mold base, which, on the one hand, simplifies the overall architecture of the machine and, on the other hand and above all, prevents the long and minute adjustments required for the correct mutual positioning of the two cams. Moreover, each mold now constitutes a complete functional unit which is mounted and installed as such and which is associated only with a single source of movement in the form of the single cam.

Finally, and this is not the least of the advantages, dispensing with the independent control of the mold base with its own cam makes it possible to considerably reduce the vibration-related problems mentioned above. It thus becomes possible to envisage operating such a device at substantially higher speeds than those used to date.

In a simple manner, the aforesaid coupling means having three rotational degrees of freedom are preferably spherical ball joint couplings or comprise, for one of them, a spherical ball joint coupling and, for the other, a universal coupling.

In a simple exemplary embodiment, the lower end of the rod is connected via said spherical ball joint coupling to a link rotatably articulated on a radial arm attached to the mold base, said abutment consisting of a portion of said arm.

Although it is possible to envisage various configurations, it is nevertheless advantageous to arrange for the link to be articulated on the radial arm by a pin perpendicular to the axis of the mold; provision can then be made in particular for the link to be made in the form of a solid shoe to which the respective coupling is connected.

Advantageously, elastic return means are coupled to the mold base to assist the axial movement of the mold base from its open position to its closed position.

By virtue of the provisions according to the invention, it is possible to set up a simple structure employing only a small number of component parts which do not include any frictional parts, which avoids wear and eliminates the appearance of play. The forces transmitted are relatively small and the relatively low masses of the moving parts lead to low inertia: such a mechanism is therefore capable of operating at high speeds, making it conceivable to raise the operating speeds of the molding installation.

Constructing the moving link in the form of a solid shoe leads to a mechanically strong structure capable of withstanding, without deformation, the thrust impacts marking the transition between the movement of the half-molds alone and the movement of the half-molds accompanied by the axial movement of the mold base.

Finally, although the hinge pin of the link, or of the shoe, is advantageously perpendicular to the axis of the mold, the position of this axis is in truth immaterial: it follows that the positioning of the radial arm does not have to be of very high precision, which simplifies the construction.

The provisions of the invention find a preferred, although not exclusive, application in the molding devices having a mold of the hinged type in which the two half-molds are mutually pivoting.

BRIEF DESCRIPTION OF THE DRAWINGS

The invention will be better understood on reading the detailed description which follows of certain preferred embodiments given solely by way of nonlimiting examples. In this description, reference will be made to the attached drawings, in which.

DETAILED DESCRIPTION OF THE INVENTION

Figure 1:
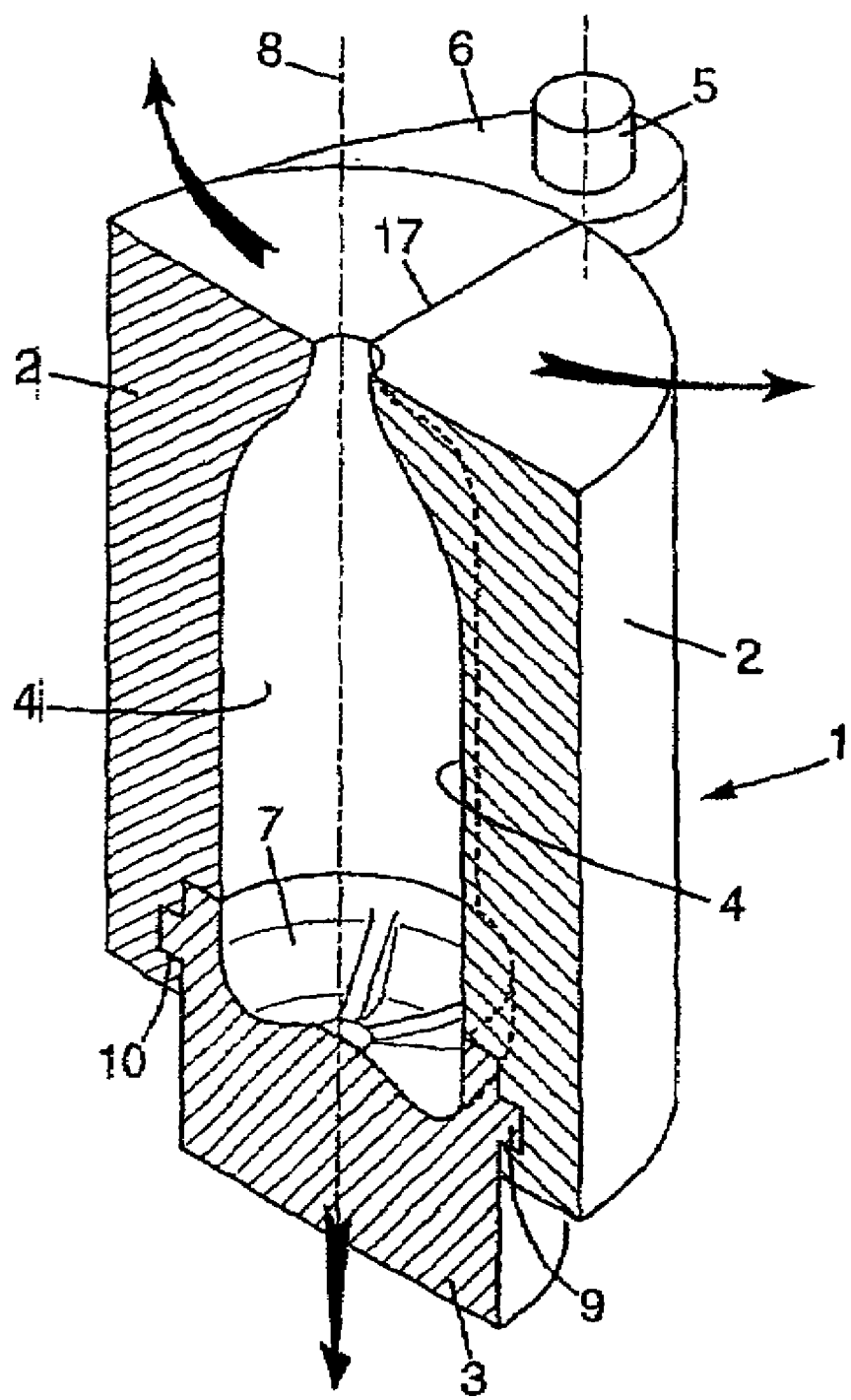
FIG. 1 is a simplified schematic view, in axial section, of a mold in three parts toward which the invention is directed.

Referring first of all to FIG. 1, the invention aims to improve the devices for blow-molding or stretch blow-molding of containers starting from preforms made of thermoplastic, such as PET, which comprise a mold 1 in three parts, namely two half-molds 2 and a mold base 3.

The two half-molds 2 each include an imprint 4 of half the body of the container to be manufactured (for example a bottle) and can be moved apart or brought together transversely. In the example illustrated, the two half-molds are designed with external lugs 6 so that they can be mounted on a common pin 5 and can be closed or opened by rotation about this pin (hinged mold). If the half-molds comprise respective mold-carrier units, the lugs 6 are formed on the latter. However, the improvements made by the invention, which will be explained later, may nevertheless be employed with molds of different design, for example with half-molds which can move by transverse translation.

Traditionally, the opening and closing of the half-molds 2 is controlled mechanically, by means consisting of articulated arms driven by a roller engaging with a fixed cam.

Such means, not shown in FIG. 1, are described and illustrated, for example, in documents FR 2 653 058, FR 2 681 552 or FR 2 793 722.

The mold base 3, the third part of the mold 1, comprises the complex-shaped imprint 7 of the base of the container to be manufactured and can be moved axially along the axis 8 of the mold (axis of the container to be manufactured).

To provide a mechanical assembly of the mold base 7 with the two half-molds, in the closed position of the mold, which is capable of withstanding the forces generated by the high blow-molding pressure (for example $40 \times 10^5$ Pa), a secure connection is provided by interlockable means, such as groove/projection means. In the example illustrated in FIG. 1, the mold base 3 comprises a radial projection 9 extending over all or part of the lateral periphery of the mold base, in the upper part thereof covered by the lower parts of the half-molds 2; for their part, the half-molds 2 are each provided with a mating groove 10.

In such a configuration, it is necessary, in order to open the mold, to start opening the half-molds 2 on their own, the mold base 3 remaining in place, until the grooves 10 have freed the projection 9; then, and only then, can the mold base 3 be moved axially while the half-molds 2 complete their respective movements. In order to close the mold, it is necessary, conversely, to return the mold base 3 axially while the half-molds 2 begin their movement toward one another, so that the mold base 3 is in place while the two half-molds 2 complete their movement toward one another and while the grooves 10 cover the projection 9.

In order to eliminate the specific roller/fixed cam control used up until now for moving the mold base 3 and to avoid the difficulties brought about by the mutual positioning adjustments of the two cams controlling the half-molds 2 and the mold base 3, respectively, so as to obtain perfect synchronization of the movements described above, connection means are provided between at least one half-mold and/or said means for actuating the half-molds 2, on the one hand, and the mold base 3, on the other hand, so that the above-described sequences of synchronized movements of the half-molds 2 and of the mold base 3 are retained both during the opening and closing of the mold.

According to the invention, provision is made for the connecting means to comprise a connecting rod 13 whose ends are provided with coupling means having three rotational degrees of freedom so as to connect it to the half-mold and/or to said means for actuating said half-molds and so as to connect it to the mold base, respectively, and the connection of the rod 13 with the mold base 3 is arranged so as, during opening of the mold, to pivot freely under the entraining action of the aforesaid half-mold and/or of said means for actuating said half-molds while the two half-molds are parting until a predetermined angular value α is obtained, and then to bear against an abutment attached to the mold base 3 when the half-molds 2 are parting at said angular value α and/or when said actuating means are in a position in which the half-molds are parting at said angular value α, and finally to push the mold base 3 away axially when the two half-molds 2 complete their opening travel, and vice versa during closing of the mold.

A simple embodiment consists in interposing said connection means between one of the half-molds and the mold base, and in arranging them in the following way, for example.

Figure 2A:
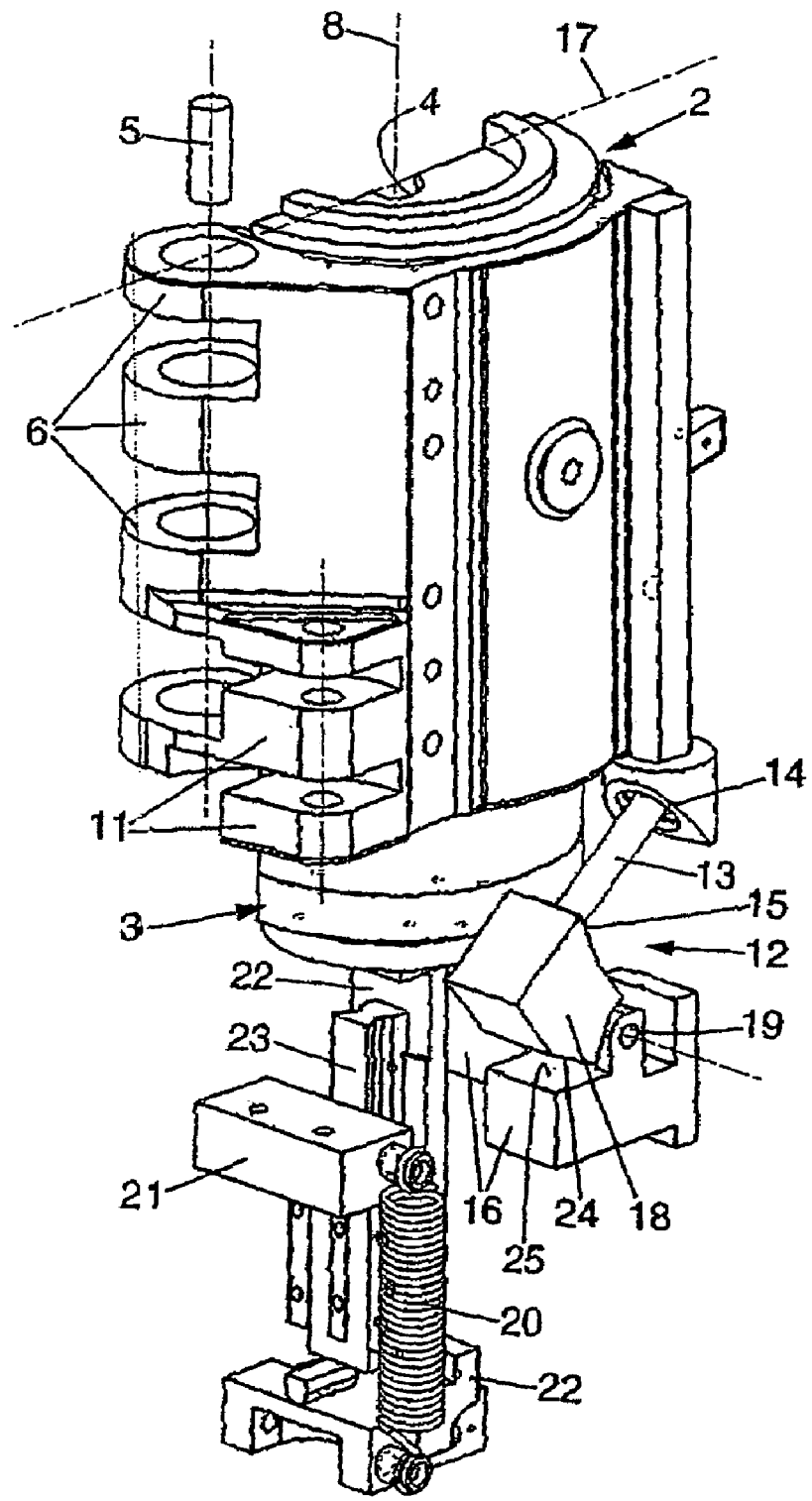
FIGS. 2A to 2C are perspective views showing one of the half-molds of FIG. 1 equipped according to the invention in three different operational positions respectively.

FIG. 2A shows an external view of one of the half-molds 2 (there can be seen the lugs 11 on which are articulated the actuating arms (not shown) driven by the roller moved by the fixed cam discussed above).

The connection means 12 interposed between the half-mold 2 and the mold base 3 comprise a connecting rod 13 provided at its two ends with spherical ball joints in order to respectively constitute a coupling 14 with the half-mold 2 and a coupling 15 with the mold base 3.

Preferably, the two couplings 14, 15 are ball joint couplings. If appropriate, one of the ball joints may be replaced by a universal joint; alternatively, one or both of these couplings may be replaced by any device providing the three degrees of freedom required to perform the abovementioned sequences.

The coupling 14 is situated on the outer wall of the half-mold 2, at a point on this wall which is relatively distant from the axis of rotation of the pin 5, so as to benefit from sufficient amplitude of movement.

The coupling 15 is advantageously provided not on the mold base itself but on the end of a radially extending arm 16 attached to the mold base 3, so that the rod 13 extends approximately parallel to the contact face 17 (parting line) of the half-mold 2.

In order for the movements indicated above to be broken down sequentially, the coupling 15 is attached to a moving part or link 18 which, in the example illustrated in FIG. 2A, is produced in the form of a solid shoe housing the spherical socket accommodating the spherical ball attached to the rod 13. The shoe 18 is rotatably articulated on the end of the arm 16 by a pin 19 which, in the example illustrated, is substantially perpendicular to the axis 8 of the mold (or to its pivot pin 5).

Furthermore, elastic return means (spring 20) are associated with the mold base 3 in order to return the latter to the closed position. In FIG. 2A, the spring 20 is interposed between a frame part 21 of the molding device and a slide 22 attached to the mold base 3 and cooperating with a fixed guide 23 in order to guide the mold base 3 in its axial movement.

FIG. 2A shows the half-mold 2 and the mold base 3 in the closed position (position illustrated also in FIG. 1).

Figure 2B:
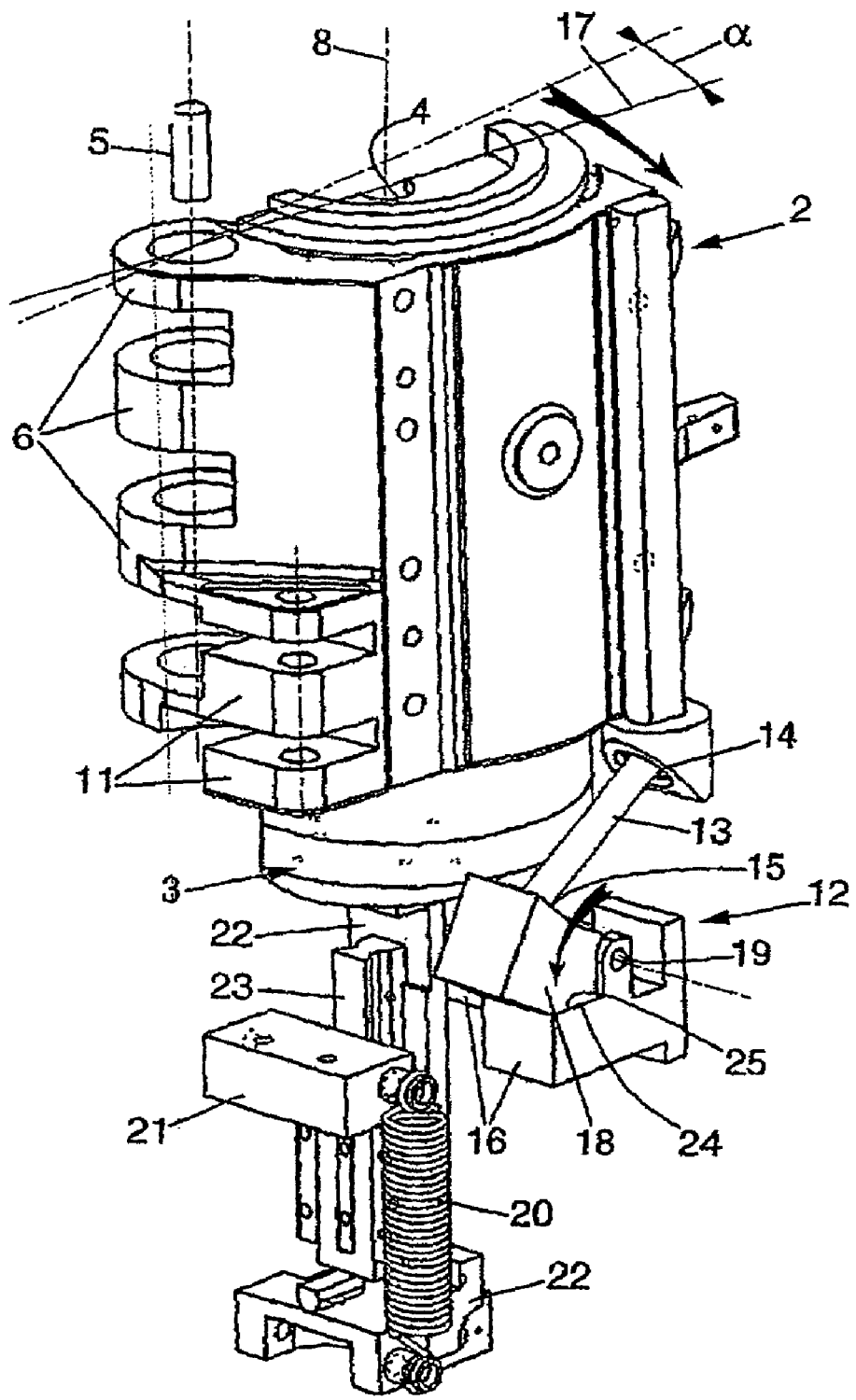

When starting to open the half-molds 2 by pivoting them about their pin 5, one of these half-molds causes, by way of the rod 13, the shoe 18 to rotate about its pin 19, as illustrated in FIG. 2B. However, the articulated connection between the shoe 18 and the arm 16 is designed in such a way (for example, as illustrated, the pin 19 is raised with respect to the arm and the shoe 18 possesses a lower face having a cant 24) that the shoe 18 can rotate freely.

Consequently, during this phase of movement of the half-molds 2, the mold base 3 is not subjected to any entraining force and it remains in its closed position, retained by the spring 20.

When the two half-molds 2 have passed through a predetermined angular range α (FIG. 2B), it is ensured that the grooves 10 have released the projection 9. At that moment, the face 24 of the shoe 18 comes into contact with a bearing surface 25, forming an abutment, of the arm 16, as illustrated in FIG. 2B.

Figure 2C:
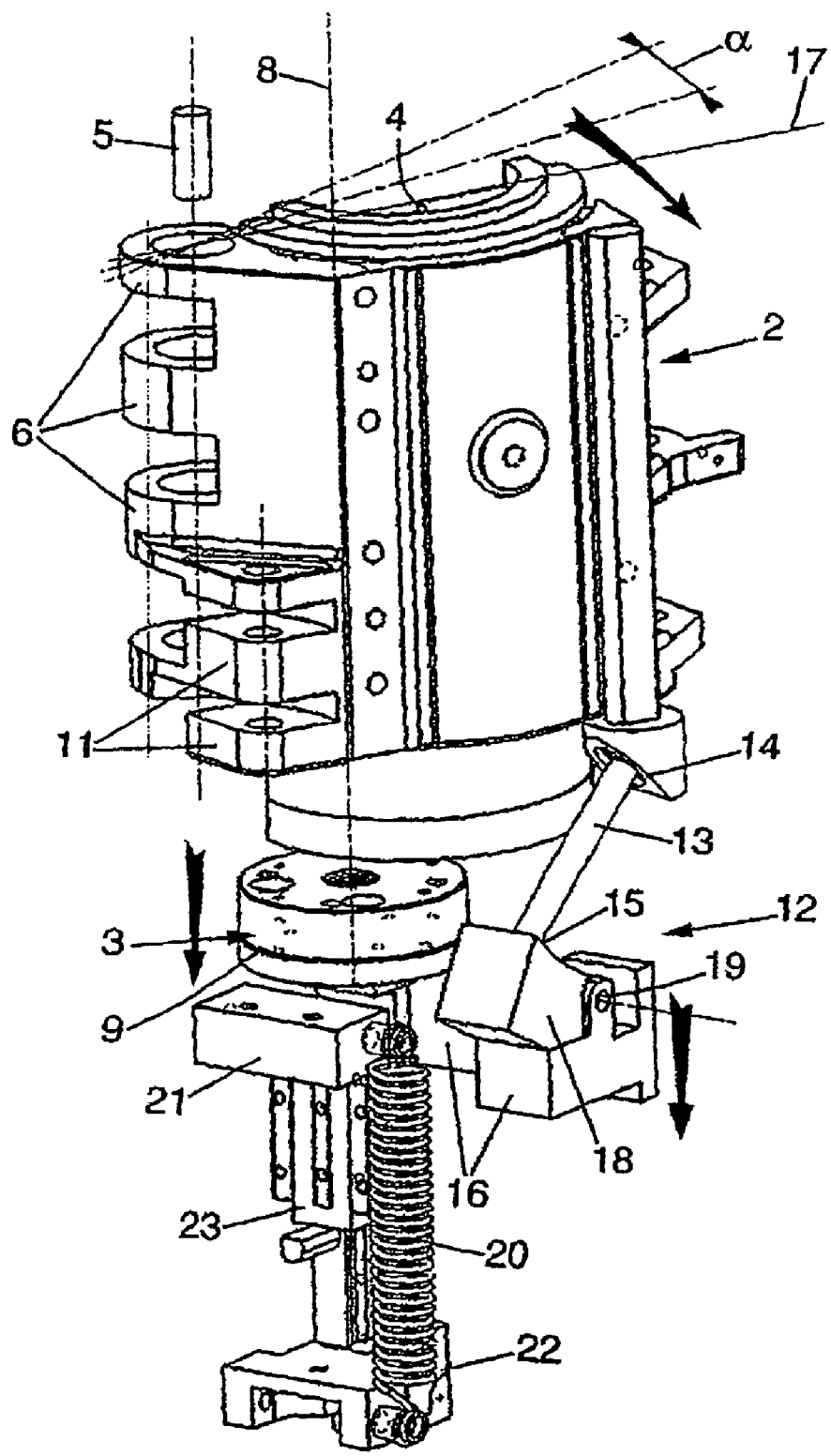

From this moment, the shoe 18 continues to be pushed away by the rod 13, but can no longer swivel with respect to the arm 16. The assembly formed by the rod and the shoe thus constitutes a strut bearing on the arm 16 and exerting thereon a downwardly directed force component. The mold base 3 is thus entrained axially in the direction of opening, as illustrated in FIG. 2C.

In the opposite direction, in order to close the mold, the half-mold 2 entrains, by way of the rod 13, the mold base 3 which arrives in its raised position when the half-mold 2 still has an angular range α to pass through. At that moment, the shoe 18 leaves its bearing point on the abutment 25 of the arm 16 and, with the mold base 3 then being detached kinematically from the half-mold 2, the latter completes its closing travel alone, with its groove 10 coming to cover the projection 9 on the mold base. During the first phase of the movement, the return force that the spring 20 exerts on the mold base 3 in order to tend to lift the latter toward its raised position for closing the mold keeps the abutment 25 of the arm 16 in contact with the shoe 18, with the result that the mold base 3 accompanies the movement of the half-mold 2.

Figure 3:
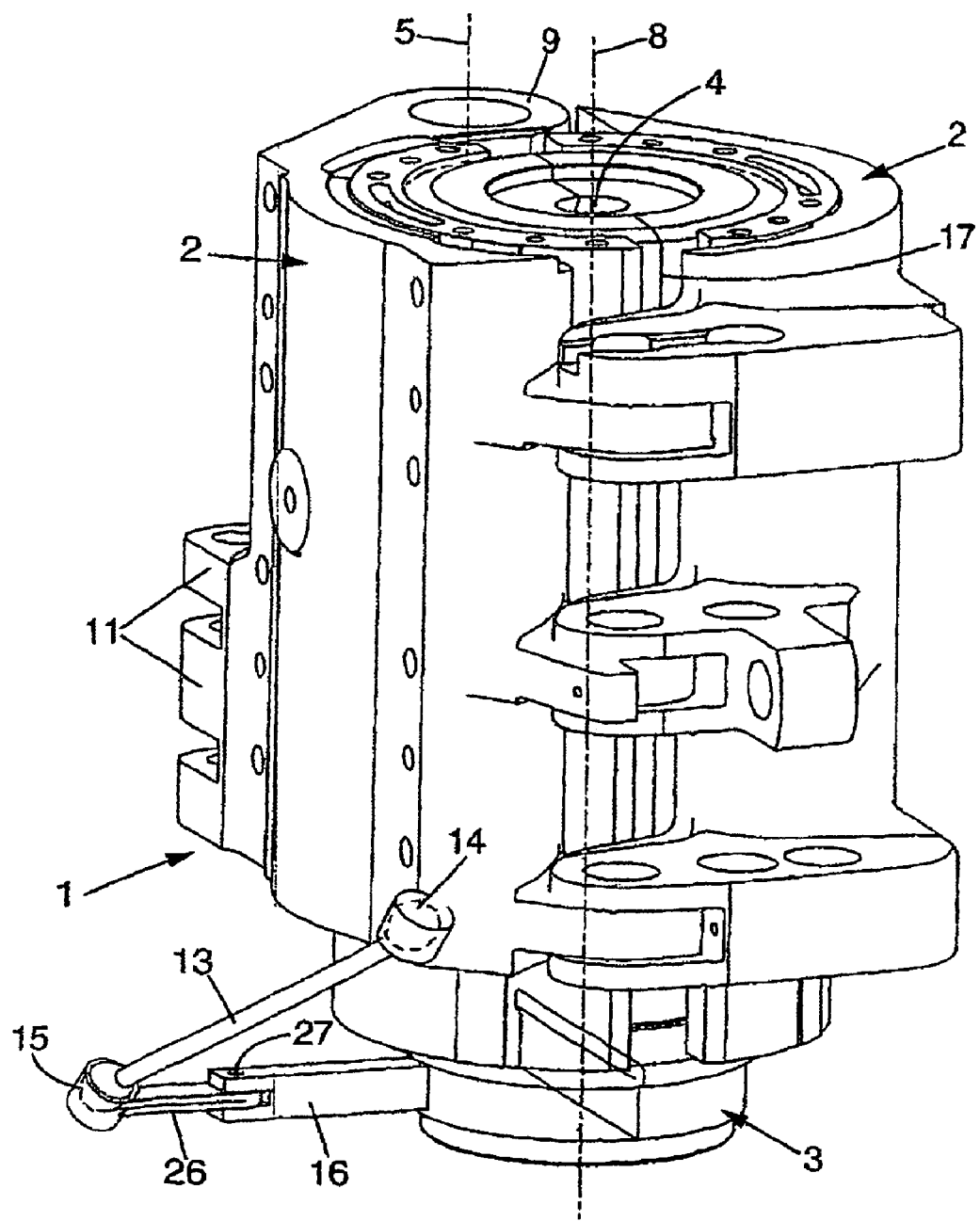
FIG. 3 is a perspective view illustrating a variant of the arrangements shown in FIGS. 2A to 2C.
Figure 4:
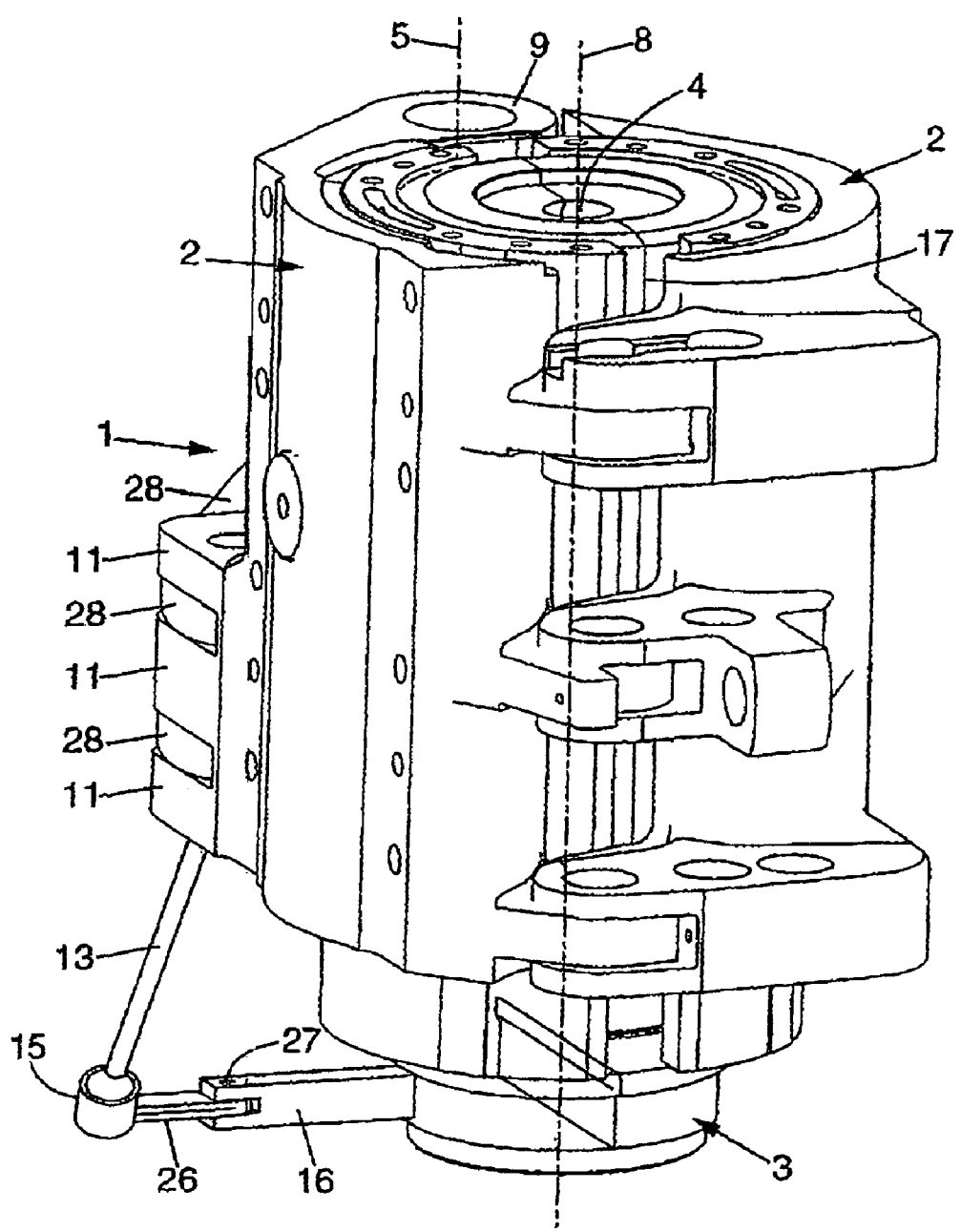
FIG. 4 is a perspective view illustrating a variant of the arrangements shown in FIG. 3.

Of course, numerous variants are conceivable. It should be emphasized in particular that the position of the pin 19 defining the axis of rotation of the shoe 18 is immaterial, which offers the advantage that the positioning of the arm 16, during the manufacturing operation, does not have to be of high precision. By way of example, FIG. 3 (in which the mold 1 is shown in its entirety, in perspective, at a different angle of view) illustrates the coupling 15 mounted at the end of an elongate link 26, itself connected at its other end to the arm 16 attached to the mold base 3 so that this link is able to rotate by means of a pin 27 approximately parallel to the axis 8 of the mold. Similarly, FIG. 4 illustrates another embodiment modeled on that of FIG. 3 and in which the connecting rod 13, constituting the aforesaid connection means, is interposed between the link 26 and an arm 28 (only partly visible) rotatably connected to the lugs 11 (the coupling 14 with the arm 28 being hidden).

The invention claimed is:

1. A device for blow-molding or stretch blow-molding of containers starting from preforms made of thermoplastic, said device comprising a mold in three parts, namely two half-molds for the body of the container and a mold base for the base of the container, the lower parts of the two half-molds and the upper part of the mold base comprising means which can interlock, in the closed position of the mold, to provide the axial rigidity of the mold in the presence of the blow-molding pressure, the two half-molds being designed to be moved relative to one another, between an open position and a closed position, under the action of actuating means controlled by a fixed cam, this device comprising connection means between at least one half-mold and/or said means for actuating said half-molds, on the one hand, and the mold base, on the other hand, so that the movement of the mold base is controlled by the movement of at least one half-mold and/or said actuating means such that:

during opening of the mold, said actuating means start to move said half-molds apart until said interlockable means are freed from one another, while said connection means remain inoperative and the mold base remains in its position, and then, while said actuating means continue to move the two half-molds apart, the connection means become operational and move the mold base so as to separate it axially from said half-molds, and such that during closing of the mold, said actuating means start to bring the two half-molds together at the same time as said connection means control the axial movement of the mold base until it reaches its completely raised position, and then, with said connection means becoming inoperative, said actuating means finish bringing the two half-molds together, with engagement with the interlockable means mechanically and axially securing the two half-molds and the mold base, wherein the connection means comprise a connecting rod whose ends are provided with coupling means having three rotational degrees of freedom so as to connect it to the half-mold and/or to said means for actuating said half-molds and so as to connect it to the mold base, respectively, and in that the connection of the rod with the mold base is arranged so as, during opening of the mold, to pivot freely under the entraining action of the aforesaid half-mold and/or of said means for actuating said half-molds while the two half-molds are parting until a predetermined angular value is obtained, and then to bear against an abutment attached to the mold base when the half-molds are parting at said angular value and/or when said actuating means are in a position in which the half-molds are parting at said angular value, and finally to push the mold base away axially when the two half-molds complete their opening travel, and vice versa during closing of the mold.

2. The molding device as claimed in claim 1, wherein said connection means are interposed between one of the half-molds and the mold base.

3. The molding device as claimed in claim 1, wherein the coupling means having three rotational degrees of freedom are spherical ball joint couplings.

4. The molding device as claimed in claim 1, wherein the coupling means having three degrees of freedom comprise, for one of them, a spherical ball joint coupling and, for the other, a universal coupling.

5. The molding device as claimed in claim 3, wherein the lower end of the rod is connected via the respective coupling to a link rotatably articulated on a radial arm attached to the mold base, said abutment including a portion of said arm.

6. The molding device as claimed in claim 5, wherein the lower end of the rod is connected via the respective coupling to a link rotatable articulated on a radial arm attached to the mold base, said abutment including a portion of said arm, and wherein the link is articulated on the radial arm by a pin perpendicular to the axis of the mold.

7. The molding device as claimed in claim 5, wherein the lower end of the rod is connected via the respective coupling to a link rotatably articulated on a radial arm attached to the mold base, said abutment including a portion of said arm, and wherein the link is produced in the form of a solid shoe to which the corresponding coupling is connected.

8. The molding device as claimed in claim 1, wherein elastic return means are coupled to the mold base to assist the axial movement of the mold base from its open position to its closed position.

9. The molding device as claimed in claim 1, wherein the mold is of the hinged type with the two half-molds rotatably articulated relative to one another.

* * * * *